United States Patent [19]
Barr et al.

[11] Patent Number: 5,285,333
[45] Date of Patent: Feb. 8, 1994

[54] MASS STORAGE AND RETRIEVAL SYSTEM FOR MAGNETIC TAPE CARTRIDGES

[75] Inventors: Valerie H. Barr; Jeffrey S. McGee, both of San Diego; Ronald L. Thomas, Escondido, all of Calif.

[73] Assignee: Archive Corporation, Costa Mesa, Calif.

[21] Appl. No.: 815,132

[22] Filed: Dec. 27, 1991

[51] Int. Cl.$^5$ .............................................. G11B 15/68
[52] U.S. Cl. .................... 360/92; 360/98.06; 369/192
[58] Field of Search ................... 360/92, 98.04, 98.06; 369/36-39, 191-192, 196

[56] References Cited

U.S. PATENT DOCUMENTS

| | | | |
|---|---|---|---|
| 3,453,397 | 7/1969 | Miller et al. | 179/100.2 |
| 3,817,607 | 6/1974 | Anderson | 352/74 |
| 3,860,964 | 1/1975 | Kozu et al. | 360/92 |
| 4,133,013 | 1/1979 | Fisher | 360/92 |
| 4,561,078 | 12/1985 | Nakayama | 369/38 |
| 4,635,150 | 1/1987 | Kato et al. | 360/98 |
| 4,652,939 | 3/1987 | Baumeister | 358/342 |
| 4,653,037 | 3/1987 | Nakayama et al. | 369/38 |
| 4,668,150 | 5/1987 | Blumberg | 414/273 |
| 4,697,215 | 9/1987 | Hata | 360/95 |
| 4,772,968 | 9/1988 | Nonaka et al. | 360/92 |
| 4,802,035 | 1/1989 | Ohtsuka | 360/92 |
| 4,835,634 | 5/1989 | Ostwald | 360/92 |
| 4,860,133 | 8/1989 | Baranski | 360/92 |
| 4,912,575 | 3/1990 | Shiosaki | 360/71 |
| 4,918,548 | 4/1990 | O'Donnell et al. | 360/92 |
| 4,945,429 | 7/1990 | Munro | 360/92 |
| 4,945,430 | 7/1990 | Konishi | 360/92 |
| 4,954,915 | 9/1990 | Koda et al. | 360/92 |
| 4,993,010 | 2/1991 | Kishimura et al. | 369/36 |
| 5,045,958 | 9/1991 | Leonard et al. | 360/92 |
| 5,065,265 | 11/1991 | Pierrat | 360/92 |

*Primary Examiner*—A. J. Heinz
*Attorney, Agent, or Firm*—Fliesler, Dubb, Meyer & Lovejoy

[57] ABSTRACT

A plurality of modules are removeably mounted in a rack. At least one of the modules is a drive module including a tape drive and at least one of the modules is a storage module including a carrousel for removeably receiving a plurality of magnetic tape cartridges. The storage module includes mechanisms for rotating the carrousel to present a selected cartridge to a withdrawal and replacement position. The drive and storage modules have track segments which are aligned in end-to-relation. A robot carries the selected cartridge between the carrousel and the tape drive. The robot includes a carriage mounted for traveling along the track segments and a gripper for gripping and releasing the selected cartridge. The system further comprises a control and sequencing circuit for rotating the carrousel, moving the carriage and operating the gripper.

10 Claims, 4 Drawing Sheets

MASS STORAGE AND RETRIEVAL SYSTEM FOR MAGNETIC TAPE CARTRIDGES

BACKGROUND OF THE INVENTION

The present invention relates to data processing systems, and more particularly, to automated apparatus for selectively loading magnetic tape cartridges from a library into a tape drive.

Tape drives are widely used as peripheral memory storage devices for computer systems. In the early days of computer processing, tape drives typically utilized open reels of one-half inch magnetic tape which were manually loaded onto so-called vacuum column tape drives. Tape cartridges have largely supplanted open reels of tape as the preferred form of tape media used for data storage. Examples of popular data storage tape cartridges are 3M's DC600, IBM's 3480 and DEC's TK/50.

In many data processing environments, it is useful to have on-line access to a selection of tape cartridges. One way to accomplish this is to utilize a magazine that holds a stack of tape cartridges. The magazine can be incremented either up or down so that a tape cartridge loader can access the selected tape cartridge and load it into an associated tape drive. See for example, U.S. Pat. No. 5,045,958 granted Sep. 3, 1991 to Leonard, et al. and assigned to Storage Technology Corporation. While this approach is serviceable, the number of tape cartridges that can be held in the magazine is limited. A much more expansive library of tape cartridges can be stored in a linear arrangement in racks or in carrousels. See for example, U.S. Pat. No. 5,065,265 granted Nov. 12, 1991 to Michel A. Pierrat.

Heretofore mass storage systems for magnetic tape cartridges have required custom cabinets. They have not been flexible in terms of capacity and they have been relatively expensive. Furthermore, they have not easily permitted a user to grow its library of tape cartridges.

SUMMARY OF THE INVENTION

It is therefore the primary object of the present invention to provide an improved mass storage and retrieval system for magnetic tape cartridges.

It is another object of the present invention to provide such a mass storage and retrieval system that does not require custom cabinets.

It is another object of the present invention to provide such a system that is more flexible in size and more easily permits a user to grow its library of magnetic tape cartridges.

According to the present invention, a mass storage and retrieval system for magnetic tape cartridges comprises a rack and a plurality of removeable modules, at least one of which is a drive module including a tape drive and at least one of which is a storage module including a carrousel for removeably receiving a plurality of magnetic tape cartridges. The storage module includes mechanisms for rotating the carrousel to present a selected tape cartridge to a withdrawal and replacement position. The drive and storage modules have track segments which are aligned in end-to-end relation. A robot carries the selected cartridge between the carrousel and the tape drive. The robot includes a carriage mounted for traveling along the track segments and a gripper for gripping and releasing the selected cartridge. The system further comprises a control and sequencing circuit. The carrousel rotates to present the selected cartridge to the withdrawal and replacement position. The carriage travels to the replacement and withdrawal position. The gripper extends and grips the selected cartridge and thereafter retracts. The carriage travels to the tape drive and the gripper extends to insert the tape cartridge into the tape drive and the gripper releases the cartridge.

DESCRIPTION OF THE PREFERRED EMBODIMENT

Figure 1:
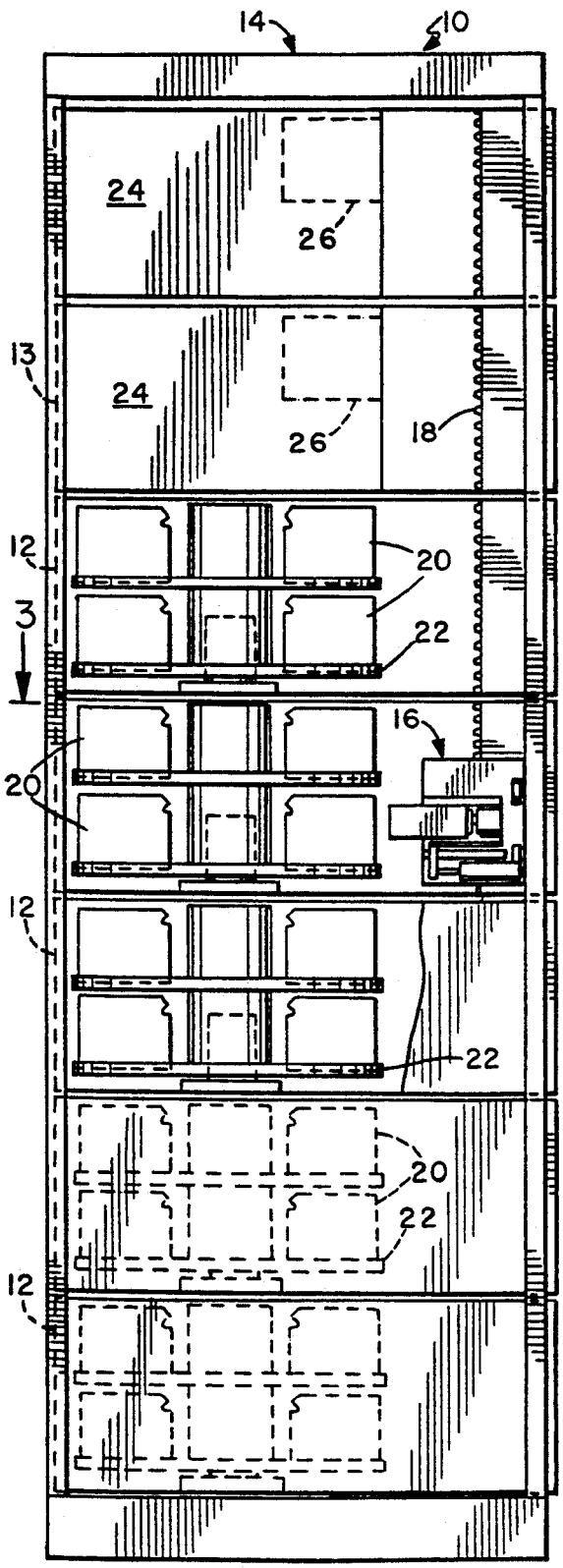
FIG. 1 is a side elevation view of a mass storage and retrieval system for magnetic tape cartridges in accordance with a preferred embodiment of the present invention.

Referring to FIG. 1, the preferred embodiment of our system 10 comprises a plurality of rectangular storage and drive modules 12 and 13, respectively, which are supported in a vertically stacked arrangement by a surrounding upright rectangular rack 14. A robot 16 travels vertically between the modules on a toothed track 18 for selectively retrieving individual magnetic tape cartridges such as 20 supported on carrousels 22 within the storage modules 12. The robot 16 can deliver a selected tape cartridge to either of a pair of tape drives 24 supported in the drive modules 13. The tape drives have slots 26 for receiving the tape cartridges. The robot 16 can insert and withdraw a tape cartridge from either of the insertion slots of the tape drives. The rack 14 is preferably an EIA Standard RS-310C rack.

The tape cartridges 20 may be those sold under the designation 3480 by IBM. This tape cartridge utilizes a leader block. Details of this cartridge are disclosed in U.S. Pat. Nos. 4,335,858; 4,334,656; 4,383,660 and 4,452,406. The system may be designed to accommodate any other standard tape cartridges used for data storage. The tape drives 24 may be any tape drives compatible with the tape cartridges. See for example U.S. Pat. No. 4,949,914 granted Aug. 21, 1990 to William M. Barton, Jr. and assigned to Cipher Data Products, Inc. of San Diego, California. The same rack may include storage modules for the IBM 3480 and DEC TK/50 tape cartridges and two different tape drives for accommodating these different cartridges. Examples of suitable commercially available tape drives are the Cipher Data TapeXpress tape drive for the 3480 cartridge and the Digital Equipment TK/50 tape drive for the DEC TK/50 cartridge. The tape drives 24 are vertically oriented within the rack 14, i.e., so that when a tape cartridge is loaded therein, the tape reel within the cartridge rotates about a horizontal axis. The tape cartridges 20 are loaded within the carrousels 22 in a vertical manner. Therefore, the robot 16 can withdraw a tape cartridge from one of the carrousels, move it to one of the tape drives, and insert the tape cartridge therein, without having to rotate the tape cartridge from its vertical orientation.

Figure 2:
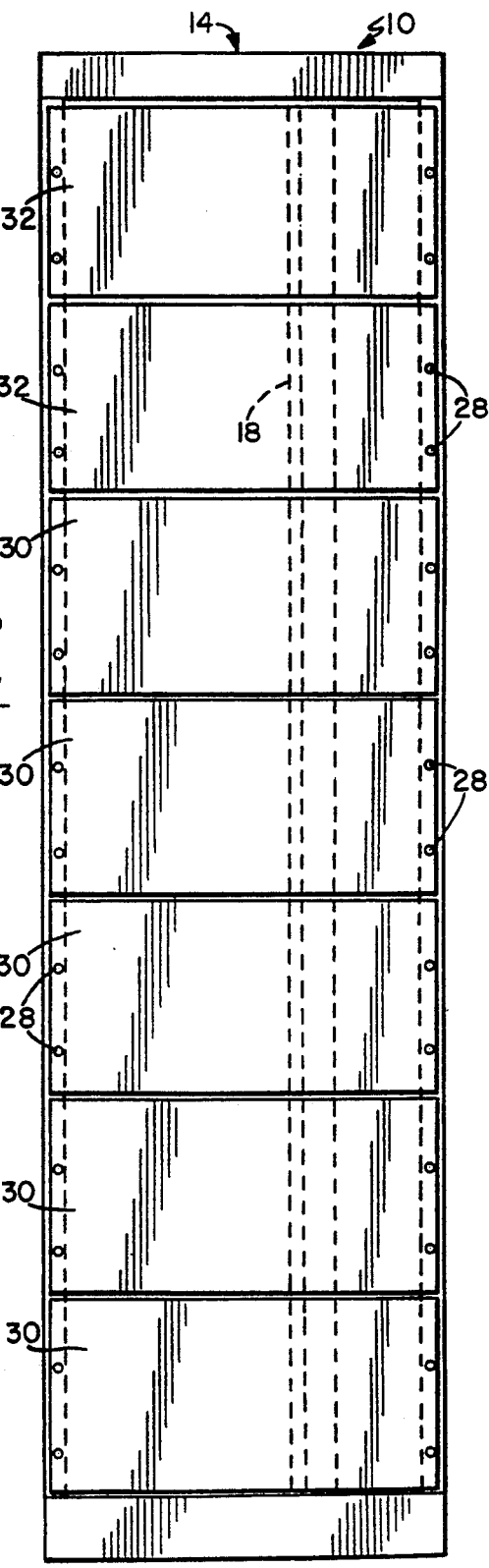
FIG. 2 is front elevation view of the system of FIG. 1.

Referring to FIG. 2, the storage and drive modules 12 and 13 have a height, width and length that permits them to be readily slid into the rack 14 and secured to the side rails thereof via screws 28. Each storage module 12 has a front panel 30 which completely encloses and protects the robot and carrousels. Each drive module 13 has a similar front panel 32. Our mass storage system may include a single storage module 12, a single drive module 13 and a single robot 16 mounted within a single rack 14. As the user's library requirements expand, additional storage and drive modules may be added to the rack. Further expansion of the system may be accomplished by adding additional racks including additional storage and tape drive modules.

Figure 3:
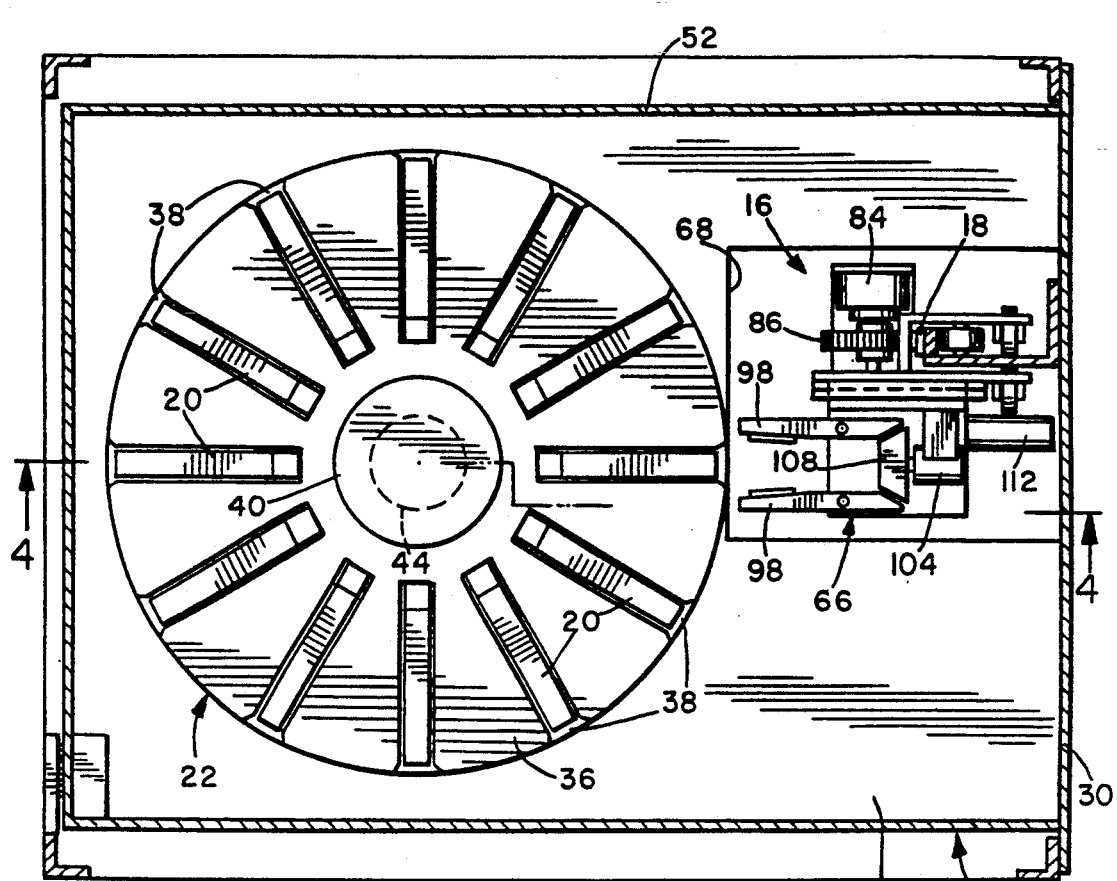
FIG. 3 is an enlarged horizontal sectional view of the system of FIG. 1 taken along line 3—3 of FIG. 1.
Figure 4:
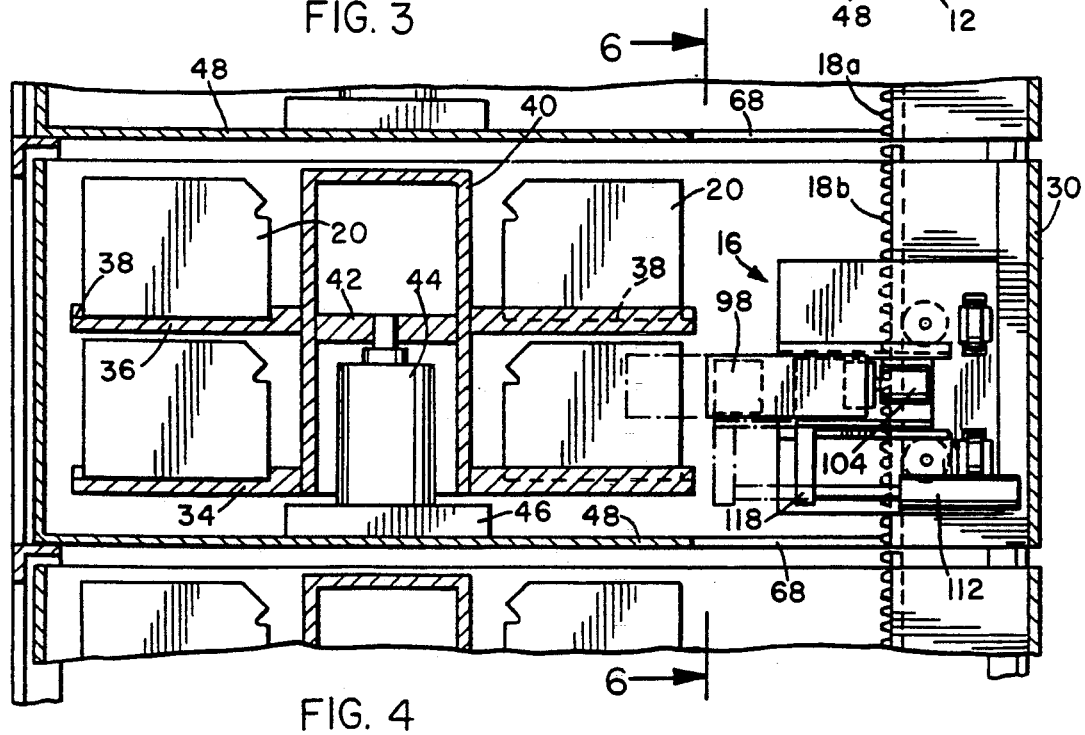
FIG. 4 is an enlarged, fragmentary vertical sectional view taken along line 4—4 of FIG. 3.

Referring to FIGS. 3 and 4, twin removeable carrousels 22 are mounted within each storage module 12. They include disks 34 and 36 having radially extending slots 38 for receiving and supporting a plurality of magnetic tape cartridges 20 in a vertical orientation. The disks 34 and 36 are supported and carried by a central hub 40. The hub is cylindrical in shape and extends through circular holes in each of the disks. A circular support plate 42 (FIG. 4) within the hub 40 is secured about its periphery to the inner wall of the hub 40. The upper end of the drive shaft of a motor 44 extends through a hole in the center of the support plate 42 and is rigidly secured thereto. The drive motor 44 is mounted on a base 46 carried by a bottom wall 48 of the storage module 12. The drive motor 44 can be energized to present a selected one of the tape cartridges on either the upper or lower carrousel to a withdrawal and replacement position adjacent the robot 16.

As best seen in FIGS. 3 and 4, each of the storage modules 12 and drive modules 13 includes a generally box-like outer housing 52 which is preferably slide mounted to the frame 14. A power supply (not illustrated) is located at back of one of the drive modules 13. It supplies power to all components in the rack. Power distribution cables (not illustrated) from the power supply hang down the back of the rack to supply power to all modules. A control and sequencing circuit 60 (FIG. 7) is carried on a PC board (not illustrated). By way of example, the PC board may be secured to the frame 14 above the modules.

The toothed track 18 (FIG. 1) comprises a plurality of individual segments which extend through each of the storage modules 12 and the drive modules 13. When the modules are mounted within the rack 14, the segments of this toothed track abut one another in end-to-end relation. This is best seen in FIG. 4 where the lower end of segment 18a is closely spaced adjacent to the upper end of segment 18b between adjacent storage modules. Each segment of the toothed track is supported on an L-shaped bracket 62 (FIGS. 3 and 4). The bracket of each module is attached to its corresponding front panel such as 30.

Referring to FIG. 3, the robot 16 includes a motor driven carriage 64 and an actuator driven cartridge gripper 66. The robot 16 reciprocates up and down along the track 18 through rectangular cut-outs 68 in the bottom walls of the modules.

The carriage 64 (FIGS. 5 and 6) includes a vertical support plate 70 to which is connected an L-shape member 72. The plate 70 and member 72 extend on either side of the L-shaped bracket 62 which supports the toothed track 18. The support plate 70 and L-shaped member 72 each carry trunions 74 and 76 which carry axles on which are journaled guide rollers 78 and 80. These guides rollers extend through holes in the plate 70 and member 72 and engage and ride along opposite sides of the longer leg of the L-shaped bracket 62.

Another L-shaped member 82 (FIG. 5) is connected to the support plate 70 and carries a pinion drive motor 84. A pinion or gear 86 is carried on a drive shaft 88 of the motor 84. The outer end of the drive shaft is journaled in a hole in the support plate 70. The pinion 86 extends through a slot 90 (FIG. 5) in the shorter leg of the L-shaped member 72 and meshes with the toothed track 18. The motor 84 can be energized to drive the carriage 64 up and down along the track 18 through the modules 12 and 13.

Figure 5:
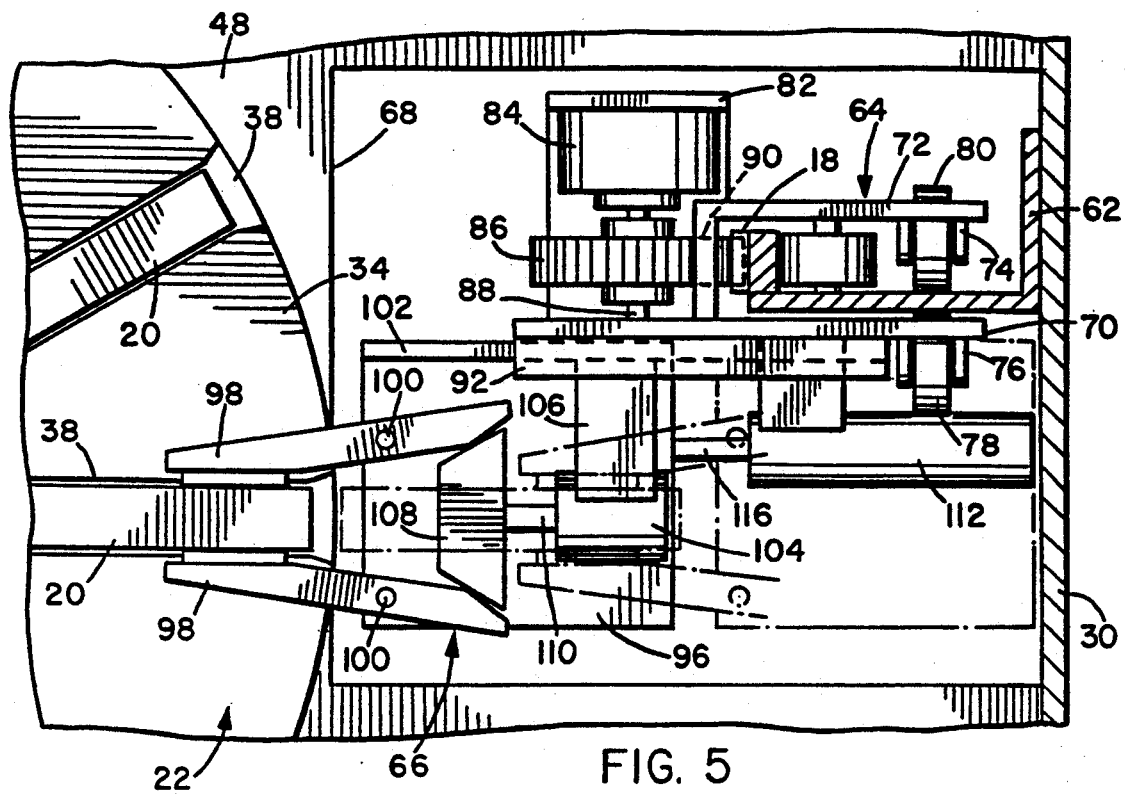
FIG. 5 is an enlarged top plan view of the moveable carriage and cartridge gripper of the system. Extended and retracted positions of the cartridge gripper are shown in solid and dashed lines, respectively.
Figure 6:
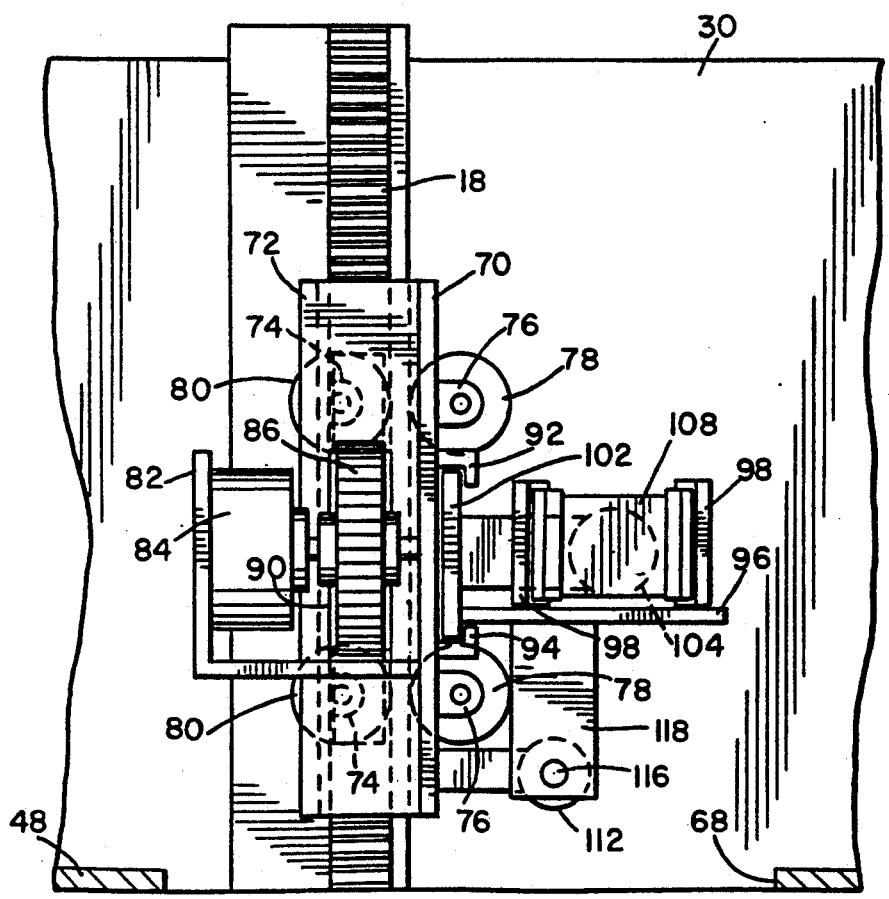
FIG. 6 is an enlarged vertical sectional view taken along line 6—6 of FIG. 4 illustrating further details of the moveable carriage and cartridge gripper of the system.

Details of the extensible cartridge gripper 66 (FIG. 1) are illustrated in FIGS. 5 and 6. Upper and lower L-shaped rails 92 and 94 are secured to, and extend horizontally along, one side of the support plate 70. A horizontal rectangular platform 96 carries a pair of pivotable jaws 98. The jaws pivot around pins 100 which extend upwardly from the platform 96 through holes in the jaws. A vertical guide plate 102 is connected to a side edge of the platform 96 and slides between the upper and lower L-shaped rails 92 and 94. A solenoid actuator 104 is connected to an arm 106 which is in turn connected to the guide plate 102. A jaw wedge clamp 108 is connected to the outer end of an actuator rod 110 of the solenoid actuator 104. The rearward ends of the jaws 98 are tapered such that the solenoid actuator 104 may be energized to move the jaw wedge clamp 108 to the left and to the right in FIG. 5, thereby clamping or unclamping the jaws around one of the cartridges 20. In FIG. 5, the jaws 98 are shown in solid lines clamped around a tape cartridge 20.

Another solenoid actuator 112 (FIGS. 5 and 6) is carried by another arm 114 secured to the support plate 70. The actuator rod 116 of the solenoid actuator 112 is connected to a vertical arm 118 secured to the underside of the platform 96. The solenoid actuator 112 can be energized to move the platform 96, and the gripper jaws 98 to their extended positions illustrated in solid lines in FIG. 5 and to their retracted positions illustrated in phantom lines in FIG. 5.

Figure 7:
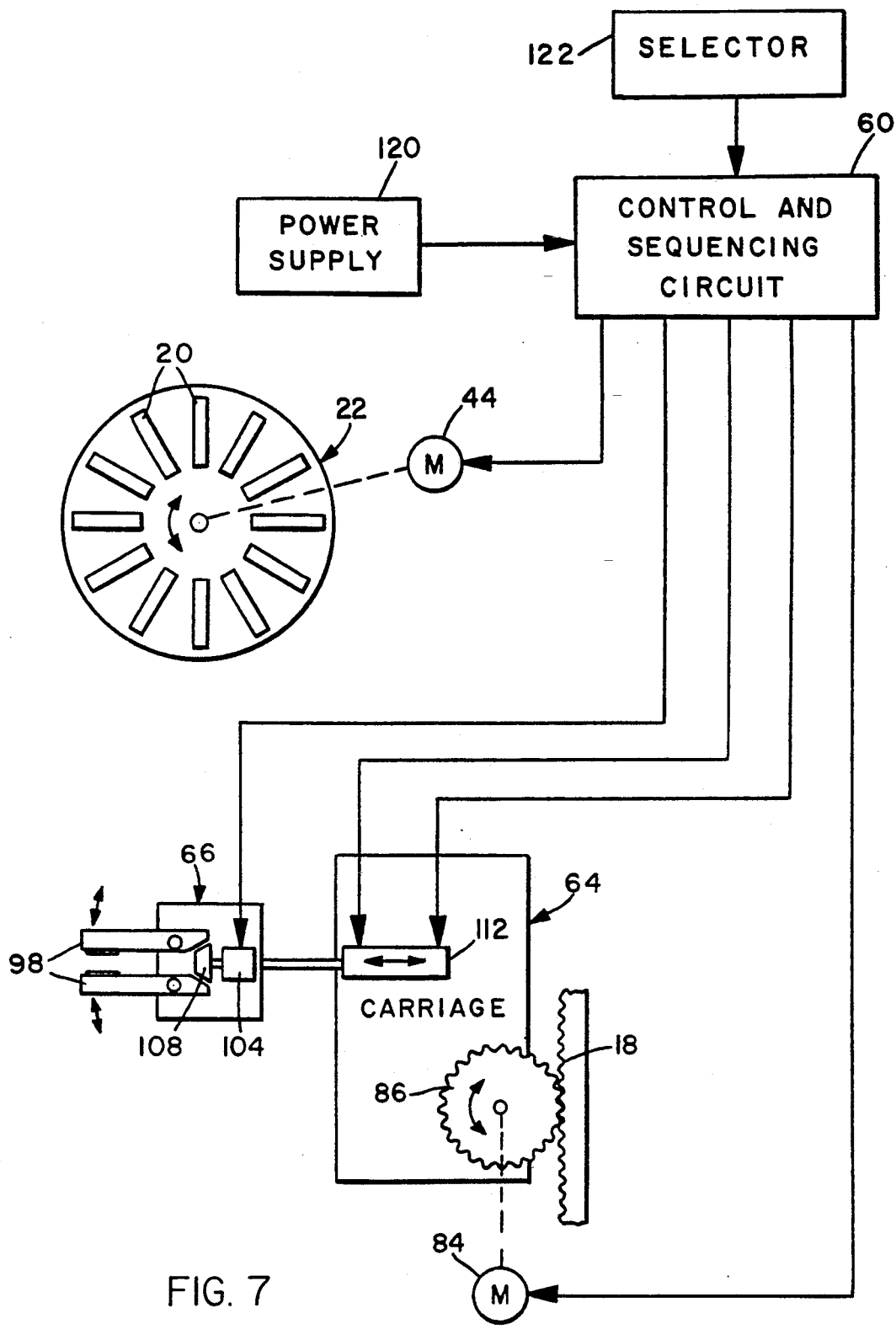
FIG. 7 is a diagrammatic illustration of the manner in which the system of FIGS. 1-6 is controlled.

Referring to FIG. 7, the solenoid actuators 104 and 112 and the pinion drive motor 84 are connected to the control and sequencing circuit 60 which is connected to a power supply 120. The circuit 60 provides the necessary drive current to the motor 84 to move the carriage 64 vertically through the modules between the selected carrousel 22 and the selected tape drive 24. The circuit 60 further provides the necessary current to the solenoid actuator 112 for horizontally extending and retracting the gripper 66. The circuit 60 further provides the necessary current to the solenoid actuator 104 for causing the jaws 98 to open and close around a selected tape cartridge 20. A selector circuit 122 provides an interface between the control and sequencing circuit 60 and a host computer (not illustrated). A user may load and unload a selected tape cartridge into and from a selected tape drive by inputting suitable keyboard commands.

While we have described a preferred embodiment of our mass storage and retrieval system for magnetic tape cartridges, it should be understood that modifications and adaptations thereof will occur to persons skilled in the art. For example, one rack could contain only storage modules and an adjacent rack could contain a drive module. Horizontal track mechanisms could be provided to allow the robot to travel between the racks. Therefore, the protection afforded our invention should only be limited in accordance with the scope of the following claims.

We claim:

1. A storage and retrieval system for magnetic tape cartridges, comprising:
    a rack for supporting a plurality of removable drive and storage modules wherein storage capacity can be readily increased or decreased by adding or removing storage modules;
    at least one drive module supported in the rack including a tape drive for having a magnetic tape cartridge loaded therein;
    at least one storage module supported in the rack including the drive module and including at least one carousel for removably receiving a plurality of magnetic tape cartridges in radially extending positions and means for rotating the carousel to present a selected cartridge to a withdrawal and replacement position;
    the drive module and the storage module each having integral track segments which are alignable in an end-to-end relation;
    robot means for carrying the selected cartridge between the carrousel and the tape drive including a carriage mounted for traveling along aligned track segments, means for driving the carriage along the track segments, and extensible gripper means mounted to the carriage for gripping and releasing the selected cartridge, first actuator means for causing the gripper means to grip and release the selected cartridge and second actuator means for causing the gripper means to move between an extended position and a retracted position; and
    control and sequencing circuit means for causing the carrousel to rotate to present the selected cartridge to the withdrawal and replacement position, for causing the carriage to travel to the replacement and withdrawal position, for causing the gripper means to move to its extended position, for causing the gripper means to grip the selected cartridge, for causing the gripper means to move to its retracted position, for causing the carriage to travel along the track segments to the drive module, and for causing the gripper means to move to its extended position to load the tape cartridge into the tape drive.

2. A storage and retrieval system according to claim 1 wherein the storage module has a pair of carrousels and the rotating means includes a common central hub supporting the carrousels.

3. A storage and retrieval system according to claim 1 wherein the track segments have a plurality of teeth and the means for driving the carriage along the track segments includes a pinion for meshing with the track segments and a motor for driving the pinion.

4. A storage and retrieval system according to claim 1 wherein the first and second actuator means each comprise solenoids.

5. A storage and retrieval system according to claim 1 wherein the rack is rectangular and the modules are in a vertically stacked arrangement.

6. A storage and retrieval system according to claim 1 wherein the tape cartridges are vertically oriented when received in the carrousel in radially extending positions.

7. A storage and retrieval system according to claim 1 wherein each module has a bottom wall with a cut-out for permitting the carriage and gripper means to travel therethrough.

8. A storage and retrieval system according to claim 1 wherein the track segments are vertically oriented so that the carriage can drive vertically along the same.

9. A storage and retrieval system according to claim 8 wherein the gripper moves horizontally between its extended and retracted positions.

10. A storage and retrieval system according to claim 1 wherein each module has a front panel.

* * * * *